(12) United States Patent
Kawahara et al.

(10) Patent No.: US 8,428,312 B2
(45) Date of Patent: Apr. 23, 2013

(54) IMAGE PROCESSING APPARATUS, IMAGE PROCESSING METHOD, AND STORAGE MEDIUM

(75) Inventors: Tomokazu Kawahara, Kanagawa (JP); Tomoyuki Shibata, Tokyo (JP); Tomokazu Wakusugi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 495 days.

(21) Appl. No.: 12/760,315

(22) Filed: Apr. 14, 2010

(65) Prior Publication Data

US 2010/0266166 A1 Oct. 21, 2010

(30) Foreign Application Priority Data

Apr. 15, 2009 (JP) ................................. 2009-099226

(51) Int. Cl.
*G06K 9/00* (2006.01)
*G06K 9/62* (2006.01)

(52) U.S. Cl.
USPC ............................ 382/118; 382/218; 382/225

(58) Field of Classification Search .................. 382/118, 382/225, 217, 218; 340/5.53, 5.83
See application file for complete search history.

(56) References Cited

U.S. PATENT DOCUMENTS

| | | | |
|---|---|---|---|
| 6,181,805 B1 * | 1/2001 | Koike et al. ................... | 382/118 |
| 2008/0080743 A1 * | 4/2008 | Schneiderman et al. ...... | 382/118 |
| 2009/0041312 A1 | 2/2009 | Wakusugi | |
| 2009/0141988 A1 * | 6/2009 | Kovtun et al. ................ | 382/225 |
| 2009/0169065 A1 * | 7/2009 | Wang et al. ................... | 382/118 |
| 2010/0104146 A1 * | 4/2010 | Momosaki .................... | 382/118 |
| 2010/0226584 A1 * | 9/2010 | Weng et al. ................... | 382/225 |
| 2011/0129126 A1 * | 6/2011 | Begeja et al. ................. | 382/118 |

FOREIGN PATENT DOCUMENTS

| | | |
|---|---|---|
| JP | 2007-140823 | 6/2007 |
| JP | 2007-310703 | 11/2007 |
| JP | 2008-077536 | 4/2008 |
| JP | 2008-146539 | 6/2008 |
| JP | 2009-042876 | 2/2009 |

OTHER PUBLICATIONS

Yamagushi et al. "Face Recognition Using Temporal Image Sequence." Third IEEE International Conference on Automatic Face and Gesture Recognition, 1998, pp. 318-323.*
Office Action for Japanese Patent Application No. 2009-099226, mailed Jun. 19, 2012, 5 pgs. (with English translation).
Kawahara, Tomokazu, Face Recognition by Orthogonal Mutual Subspace Method, Study Report from Information Processing Society, Information Processing Society of Japan, Jan. 18, 2005, vol. 2005, No. 112, pp. 17-24, (with English abstract).
Grother, Patrick, Face Recognition Vendor Test 2002, Supplemental Report, NISTRIR 7083, Feb. 2, 2004; 34 pgs. (http://www.frut.org/DLs/frvt2002_supplemental.pdf).

* cited by examiner

*Primary Examiner* — Jon Chang
(74) *Attorney, Agent, or Firm* — Sprinkle IP Law Group

(57) ABSTRACT

An image processing apparatus includes: a sequence creating section configured to create a plurality of sequences in such a manner that one sequence includes consecutive face images of a same person in video image data; a similarity calculating section configured to calculate a first similarity of each pair in a plurality of face image dictionaries created for each sequence and a second similarity of each pair of each face image dictionary and a predetermined plurality of dictionaries; a similarity correcting section configured to correct the calculated and obtained plurality of first similarities by the second similarities; and a face clustering section configured to compare the plurality of first similarities corrected by the similarity correcting section with a predetermined threshold to cluster the plurality of face image dictionaries.

16 Claims, 9 Drawing Sheets

IMAGE PROCESSING APPARATUS, IMAGE PROCESSING METHOD, AND STORAGE MEDIUM

CROSS-REFERENCE TO RELATED APPLICATIONS

This application is based upon and claims the benefit of priority from the prior Japanese Patent Application No. 2009-99226 filed in Japan on Apr. 15, 2009; the entire contents of which are incorporated herein by reference.

BACKGROUND OF THE INVENTION

1. Field of the Invention

The present invention relates to an image processing apparatus, an image processing method, and a storage medium, and particularly, to an image processing apparatus, an image processing method, and a storage medium configured to cluster face images.

2. Description of the Related Art

Conventionally, various techniques for recognizing human faces by image processing are proposed, and in recent years, the techniques are widely used in products of digital cameras, etc.

For example, Japanese Patent Application Laid-Open Publication No. 2007-140823 proposes a technique for highly accurate face verification to verify human faces from still image data, even if image photographing conditions change. In the proposed technique, data of similarity and threshold are corrected in accordance with the photographing conditions to allow highly accurate face verification, even if the photographing conditions are poor.

Furthermore, for example, Japanese Patent Application Laid-Open Publication No. 2009-42876 proposes applications of a recent face detection technique for video images. One of the applications includes a video indexing technique, and a technique is proposed to improve the identification performance of faces, in which face orientations of performers are taken into consideration to classify performing scenes of each performer in video image data.

The proposed technique is a method in which the photographing conditions, etc., do not have to be analyzed. In the technique, face states that change depending on face orientations, etc., are identified, and image patterns classified for each face state are used to improve the identification performance and prevent an oversight of a performing scene.

In the latter technique, when a face is detected, a face image clustering process for clustering the detected face image data is executed. In the face image clustering, a similarity between two face images A and B is calculated, and if the similarity is over a predetermined threshold, a process of determining the face images A and B as face images of a same person is executed.

However, if the predetermined threshold is set low, different persons are classified into same groups, and if the threshold is set high, same persons are unlikely to be classified into same groups. Therefore, there is a problem that optimal setting is not easy. This is because, in face image patterns of various persons, there are faces in which the similarities with other persons tend to be high (in other words, faces that tend to look like other persons), and there are faces in which the similarities with other persons tend to be low (in other words, faces that are unlikely to look like other persons).

BRIEF SUMMARY OF THE INVENTION

According to an aspect of the present invention, an image processing apparatus can be provided, the image processing apparatus including: a sequence creating section configured to create a plurality of sequences in such a manner that one sequence includes consecutive face images of a same person in video image data; a similarity calculating section configured to calculate a first similarity of each pair in a plurality of face image dictionaries created for each sequence and a second similarity of each pair of each face image dictionary and a predetermined plurality of dictionaries; a similarity correcting section configured to correct the calculated and obtained plurality of first similarities by the second similarities; and a face clustering section configured to compare the plurality of first similarities corrected by the similarity correcting section with a predetermined threshold to cluster the plurality of face image dictionaries.

DETAILED DESCRIPTION OF THE INVENTION

An embodiment of the present invention will now be described with reference to the drawings.

(Hardware Configuration)

Figure 1:
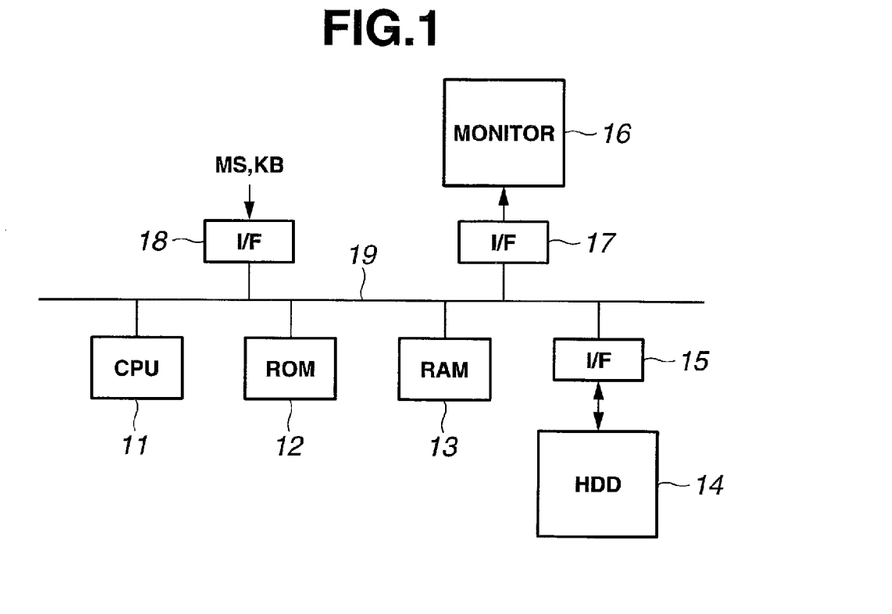
FIG. 1 is a block diagram showing a configuration of an image processing apparatus according to an embodiment of the present invention.

First, a configuration of an image processing apparatus according to the present embodiment will be described based on FIG. 1. FIG. 1 is a block diagram showing a configuration of the image processing apparatus according to the present embodiment.

As shown in FIG. 1, an image processing apparatus 1 is an information processing apparatus such as a personal computer (PC). The image processing apparatus 1 includes a central processing unit (CPU) 11, a ROM 12 storing an image processing program, etc., for a video indexing process, a RAM 13 as a working storage area of the CPU 11, an interface section (hereinafter, "I/F") 15 with an embedded or external hard disk drive (hereinafter, "HDD") 14 storing video image data, an I/F 17 with a monitor 16 configured to display images and video indexing process results, and an I/F 18 with an input device such as a keyboard, a mouse, etc. The CPU 11, the ROM 12, the RAM 13, and the I/Fs 15, 17, 18 are connected to each other through a bus 19.

In an example of image processing described below, the CPU 11 reads out the video image data stored in the HDD 14 to execute a face recognition video indexing process.

The present embodiment describes an example in which the image processing apparatus 1 is an information processing apparatus such as a PC. However, the image processing apparatus may be an apparatus, such as a TV receiver configured to store stream data of TV broadcast and an HDD recorder with TV receiving function, or an apparatus configured to store stream data, etc., distributed through a network.

In the image processing apparatus 1, the CPU 11 executes a face recognition video indexing program (hereinafter, also simply called "video indexing program") stored in the ROM 12 to apply the face recognition video indexing process (hereinafter, also simply called "video indexing process") to stream data of video images read out from the HDD 14.

The program for the video indexing process may be stored in the HDD 14, and the CPU 11 may read out and execute the program for the video indexing process stored in the HDD 14.

Therefore, when the user designates video image data to be processed to the image processing apparatus 1 to instruct the execution of the video indexing program, the CPU 11 executes the video indexing program stored in the ROM 12.

The video indexing process is a process of using a face recognition technique and providing an index to video of each recognized face to efficiently watch the video content, such as watching only the scenes of a specific performer in video image data of a TV program, etc. The image processing apparatus 1 constitutes a video indexing apparatus.

First, frames, scenes, and face sequences in the video image data will be described.

(Relationship Between Frames and Scenes)

Figure 2:
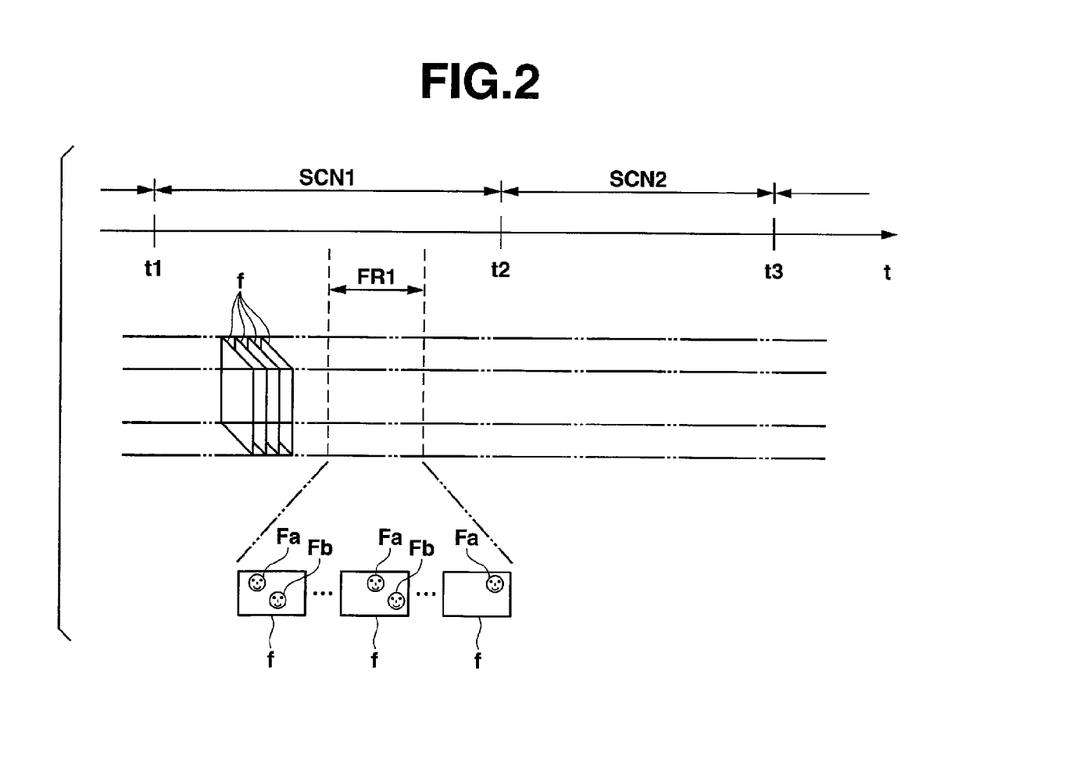
FIG. 2 is a diagram for explaining a relationship between decoded frames and scenes according to the embodiment of the present invention.

FIG. 2 is a diagram for explaining a relationship between decoded frames and scenes. The CPU 11 or a decoder not shown decodes the video image data into consecutive frame data. The video image data is, for example, data in MPEG2 format, and when the data is decoded, frame data f in the order of time passage is generated. The frame data f is outputted to the monitor 16 in accordance with a frame rate, and the viewer can watch video images.

The scenes will be described first. Video images include a part where the scene changes. For example, a scene displaying an object in the video images may switch to another scene. The switch of the scene will be called a scene cut. The scene cut may also occur, for example, when a camera is switched to another camera in a TV program, etc., and when a commercial is aired during a program. The scene cut is an instantaneous switch of a scene.

Therefore, the video images usually include a plurality of scenes. FIG. 2 shows an example, in which a scene 1 (SCN1) starts from a time t1, and the scene 1 (SCN1) ends at a time t2. After the time t2, another scene (SCN2) starts, and the scene 2 ends at a time t3. After the time t3, another scene starts. Objects are consecutively displayed in each scene. Therefore, there are few changes in the objects between the frames. However, there are many changes in the objects between the frames before and after the scene cuts.

Furthermore, there is a scene in which human faces are displayed within one scene, while there is a scene in which a face is not displayed. In the face recognition video indexing of the present embodiment, face sequences of the performers are detected in the scenes.

(Face Sequence)

The face sequence will now be described. The face sequence denotes a set of a series of temporally spatially consecutive face images and is constituted only by faces of a same person.

For example, in a range FR1 of a plurality of consecutive frames in the scene 1 (SCN1), if there is a scene in which performers A and B appear, the faces of the performers A and B are recognized by face detection, and face sequences of the performers A and B are generated. In the case of FIG. 2, the range FR1 of a plurality of frames includes a frame f including a face part Fa of the performer A and a frame f including a face part Fb of the performer B.

Figure 3:
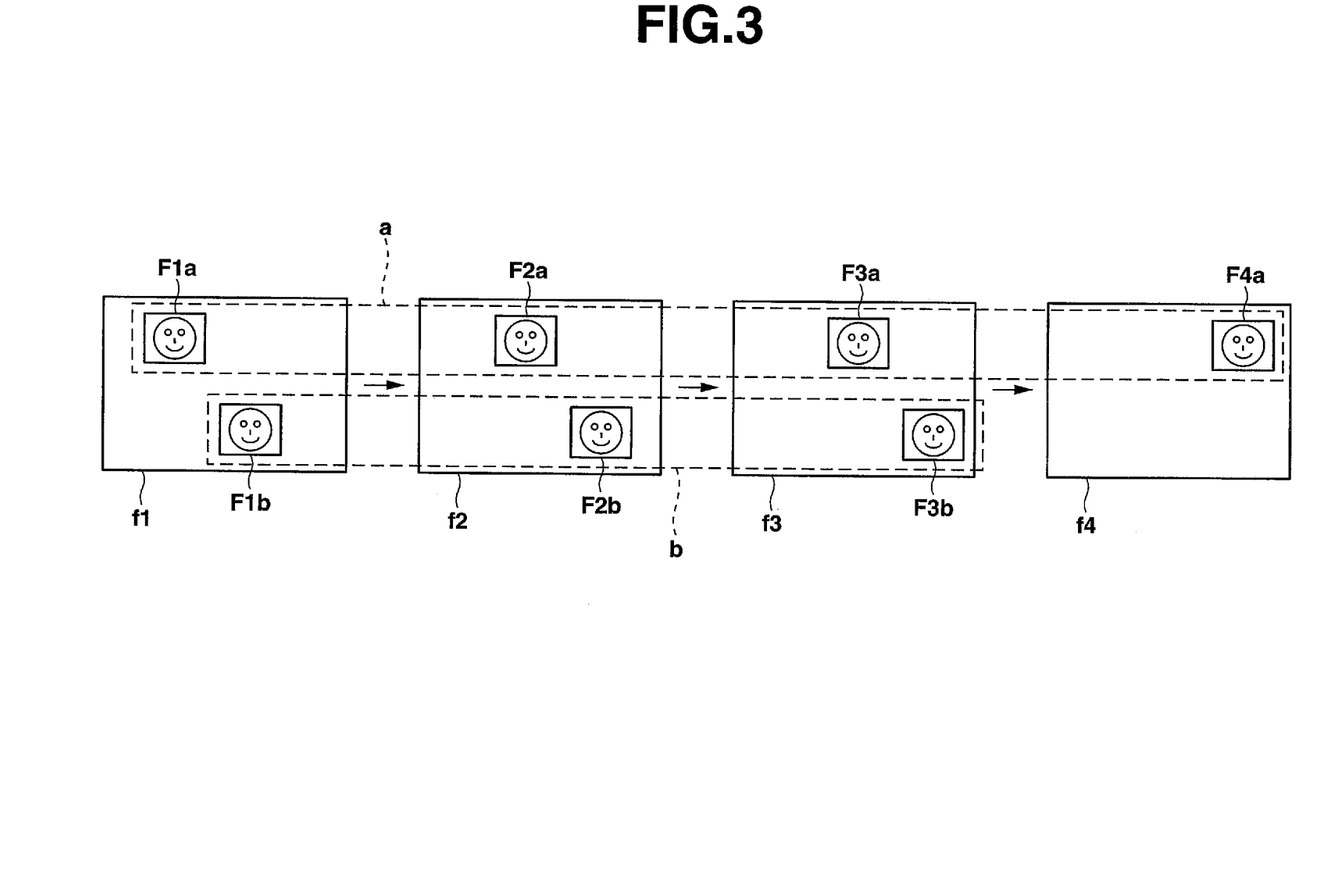
FIG. 3 is a diagram for explaining a concept of sequences of performers in consecutive frames.

FIG. 3 is a diagram for explaining a concept of the sequence of performer in consecutive frames. FIG. 3 illustrates an example of four frames f1, f2, f3, and f4 to simplify the description. In FIG. 3, seven face image parts illustrated by rectangles are detected by a face detection process between the frames f1 to f4.

The frame f1 includes a face image part F1$a$ displaying the face of the performer A and a face image part F1$b$ displaying the face of the performer B. In a face image part Fms, m denotes a frame number, and s denotes a face sequence identifier. In the following frame f2, the face image parts of the performers A and B are moved in the frame. Therefore, in the frame f2, face image parts F1$a$ and F2$b$ are moved to the right, compared to the frame f1. In the following frame f3, face image parts F3$a$ and F3$b$ are further moved to the right, compared to the frame f2. In the frame f4, the faces of the performers A and B are further moved to the right in the frame f4, compared to the frame f3. Therefore, only the face image part F4$a$ remains, and the face image part of the performer B is not included in the frame f4.

In FIG. 3, under conditions of temporal and spatial continuity, a range of the frames f1 to f4 in which the face image parts F1$a$ to F4$a$ continue is referred to as a face sequence a, and a range of the frames f1 to f3 in which the face image parts F1$b$ to F3$b$ continue is referred to as a face sequence b. The face sequence a includes four face image parts [F1$a$, F2$a$, F3$a$, F4$a$], and the face sequence b includes three face image parts [F1$b$, F2$b$, F3$b$]. Therefore, one sequence is constituted by a plurality of frames with a plurality of consecutive face images of the same person included in the video image data.

If there is a scene cut between the frames f2 and f3 in FIG. 3 as a result of the determination of the conditions of temporal and spatial continuity, there are four face sequences. More specifically, four sequences include two face image parts [F1$a$, F2$a$], two face image parts [F3$a$, F4$a$], two face image parts [F1$b$, F2$b$], and one face image part [F3$b$].

The conditions of temporal and spatial continuity are, for example, as follows. In the present embodiment, the conditions of temporal and positional continuity are defined as the following (a) to (c), and a series of faces satisfying all three conditions serves as one "face sequence".

(a) A distance between centers of a face image area of a current frame and a face image area of one frame before is close enough, in other words, within a predetermined reference distance in the frame.

(b) A size of the face image area of the current frame and a size of the face image area of one frame before are close enough, in other words, within a predetermined range.

(c) There is no scene cut between the face image area of the current frame and the face image area of one frame before. In this case, if a similarity between two consecutive frame images is within a threshold, it is determined that there is a scene cut between the two frames.

A reason that the condition (c) is added to the conditions of continuity is as follows. In video content, such as a TV program and a movie, a different person may perform in almost the same location immediately after a switch in the scene in which a person performs. In this case, there is a problem that two persons across the switch in the scene (or scene cut) are assumed as the same person. To solve the problem, the scene cut is detected, and two sequences across the scene cut are surely divided there.

(Face Recognition Video Indexing Process)

The face recognition video indexing process will now be described. The face recognition video indexing process includes processes of face detection, face sequence creation, face image feature amount extraction, face image dictionary creation, face similarity calculation, and face clustering. The processes will be described in sequence.

Figure 4:
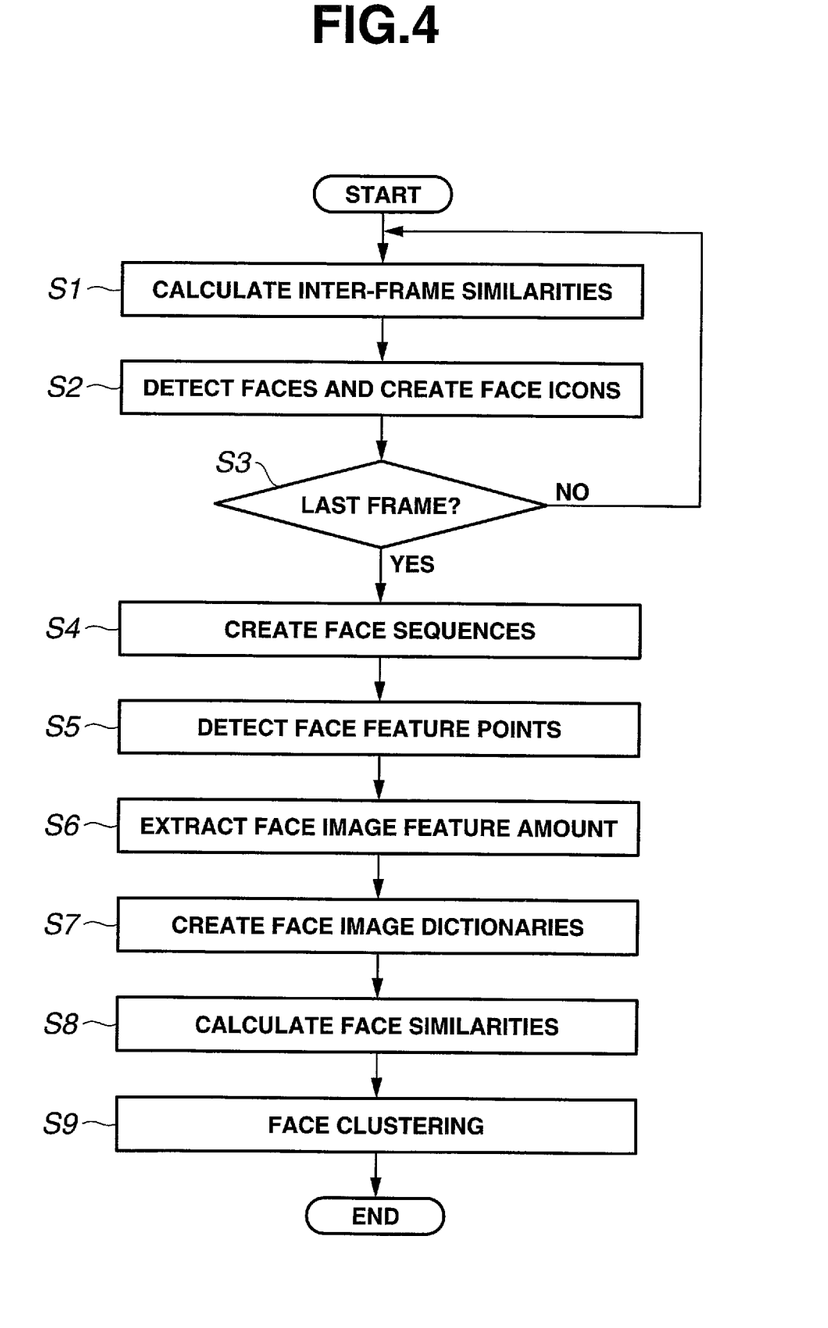
FIG. 4 is a flow chart showing an example of a flow of a face recognition video indexing process.

FIG. 4 is a flow chart showing an example of a flow of the face recognition video indexing process. The CPU 11 executes the face recognition video indexing process.

The CPU 11 first executes a process of reading out a stream of designated video content from the HDD 14 to sequentially decode the stream, generating time-series frames, and calculating similarities of frames between the generated two consecutive frames (step S1). The CPU 11 stores similarity data between the frames in a file in the RAM 13. Step S1 constitutes an inter-frame similarity calculating section configured to calculate inter-frame similarities of two consecutive frames in the video image data.

The CPU 11 then applies the face detection process to each frame, generates face icons of image data of all detected face image areas, and stores the face icons in a file in the RAM 13 (step S2). Step S2 constitutes a face image detecting section configured to detect face images in each frame included in the video image data.

An example of an applicable face detection algorithm in step S2 includes a method described in Document 1 ("Joint Harr-like Feature based on Co-occurrence Suitable for Face Detection", IEICE Transactions (D), vol. J89-D-II, no. 8, pp. 1791-1801, 2006).

The CPU 11 applies the processes of steps S1 and S2 to all frames of the video image data to be processed. Therefore, after step S2, the CPU 11 determines whether the processes of steps S1 and S2 are applied up to the last frame (step S3). If the processes are not finished up to the last frame, step S3 is NO, and the process returns to step S1.

When the processes of steps S1 and S2 are finished up to the last frame, step S3 is YES, and the process moves to a face sequence creation process (step S4). Step S4 constitutes a sequence creating section configured to create a plurality of sequences based on a plurality of detected face images and inter-frame similarities.

In the face sequence creation process of step S4, the CPU 11 uses face positions and inter-frame similarities detected in the face detection process in steps S1 and S2 to create face sequences.

As described in FIG. 3, the face sequence denotes a set of a series of temporally spatially consecutive face images and is constituted only by faces of the same person. The CPU 11 creates the face sequence under the determination of the conditions of temporal and spatial continuity. As described, the CPU 11 also determines the existence of the scene cuts at this point. If the similarity between obtained two adjacent frames is smaller than a predetermined threshold, the CPU 11 assumes that there is a scene cut between two frames.

The CPU 11 executes the process of step S4 with reference to the data obtained in steps S1 and S2. As a result of the process of step S4, data of one or more face sequences as shown in FIG. 3 is created.

Following step S4, the CPU 11 executes a face feature point detection process (step S5). The CPU 11 applies the face feature point detection process to the face icon data generated in step S2. Specifically, the CPU 11 detects face feature points in the face icon data detected in step S2. An example of a usable detection algorithm of the face feature points includes a method described in Document 2 (Mayumi Yuasa, Tomoyuki Takeguchi, Tatsuo Kozakaya, Osamu Yamaguchi "Automatic Face Feature Point Detection for Still Image Face Recognition", IEICE Research Papers, PRMU 2006-222, pp. 5-10, February 2007). The face feature points include, for example, eyes, eyebrows, corners of eyes, heads of eyes, nostrils, and end points of mouth. The CPU 11 applies the process of step S5 to the image data of all face icons. The CPU 11 generates data of each face feature point for each face icon.

The CPU 11 then extracts a face image feature amount based on the detected face feature point data (step S6). The CPU 11 uses the data of the face feature points detected in step S5 to normalize the image data of the face icons and extracts the face image feature amount based on the normalized image data. Here, to normalize means a processing for clipping, from the faces of various sizes and various orientations in the screen, face icon images in which faces are oriented to the front and have a certain size.

To extract the face image feature amount, the CPU 11 estimates a face orientation from fourteen face feature points here and creates a face image, in which the face orientation is corrected to the front. In this way, the CPU 11 can apply robust face clustering, or face image clustering, to a change in the face orientation in step S9 described below. Examples of usable methods of face orientation correction and face image feature amount extraction include methods described in Document 3 (Tatsuo Kozakaya, Osamu Yamaguchi, "Three-Dimensional Normalization Method based on Projective Transformation for Face Recognition", PRMU 2005-101, pp. 49-54, 2005) and Document 4 (Masashi Nishiyama, Osamu Yamaguchi, "Face Recognition Using Self Quotient Image based on Appearance Attribute Classification of Object Surface", Technical Report of IEICE, PRMU 2005-89, pp. 33-38, October 2005).

The CPU 11 then executes a process of face image dictionary creation (step S7).

In step S7, the CPU 11 uses the face image feature amount data extracted in step S6 to create a face image dictionary (subspace). The CPU 11 analyzes principal components of a plurality of face image feature amount data obtained in step S6 to extract a predetermined number of principal component feature amount data and creates face image dictionary data including only the extracted principal component feature amount data.

Specifically, the CPU 11 creates one face image dictionary for each face sequence. The face sequence usually includes a plurality of face image feature amounts, and the CPU 11 analyzes the principal components of the face image feature amounts to create one subspace and forms a face image dictionary. Details of a method of creating the subspace are described in Document 5 (Erkki Oja "Subspace Methods of Pattern Recognition" (Sangyo Tosho, 1986)).

The CPU 11 then executes a calculation process of face similarity (step S8).

The CPU 11 calculates similarities between face sequences, in other words, a similarity of each pair of the plurality of face image dictionaries. The CPU 11 calculates the similarity of each pair of face sequences as a similarity between the face image dictionaries (created in step S7) included in the face sequences. The CPU 11 usually calculates the similarities of all combinations. Therefore, if there are N face sequences, the CPU 11 calculates the similarities of all pairs of Di (i=1, 2, 3, ... N) and Dj (j=1, 2, 3, ... N). Here, i and j denote face sequence numbers. If there are N face sequences, the CPU 11 performs N*(N−1)/2 times of similarity calculations.

In the present embodiment, a subspace is used as the face image dictionary. Therefore, a mutual subspace method as a method for calculating the similarities between subspaces is used to calculate the similarities. Thus, the similarities of the pairs are calculated by the mutual subspace method. Details of the mutual subspace method are described in, for example, Document 6 ("Pattern Matching Method Introducing Local Structure", IEICE Transactions (D), vol. J68-D, no. 3, pp. 345-352, 1985).

The CPU 11 executes a correction process of similarity in the face similarity calculation in step S8. The content of the correction process will be described later.

Figure 5:
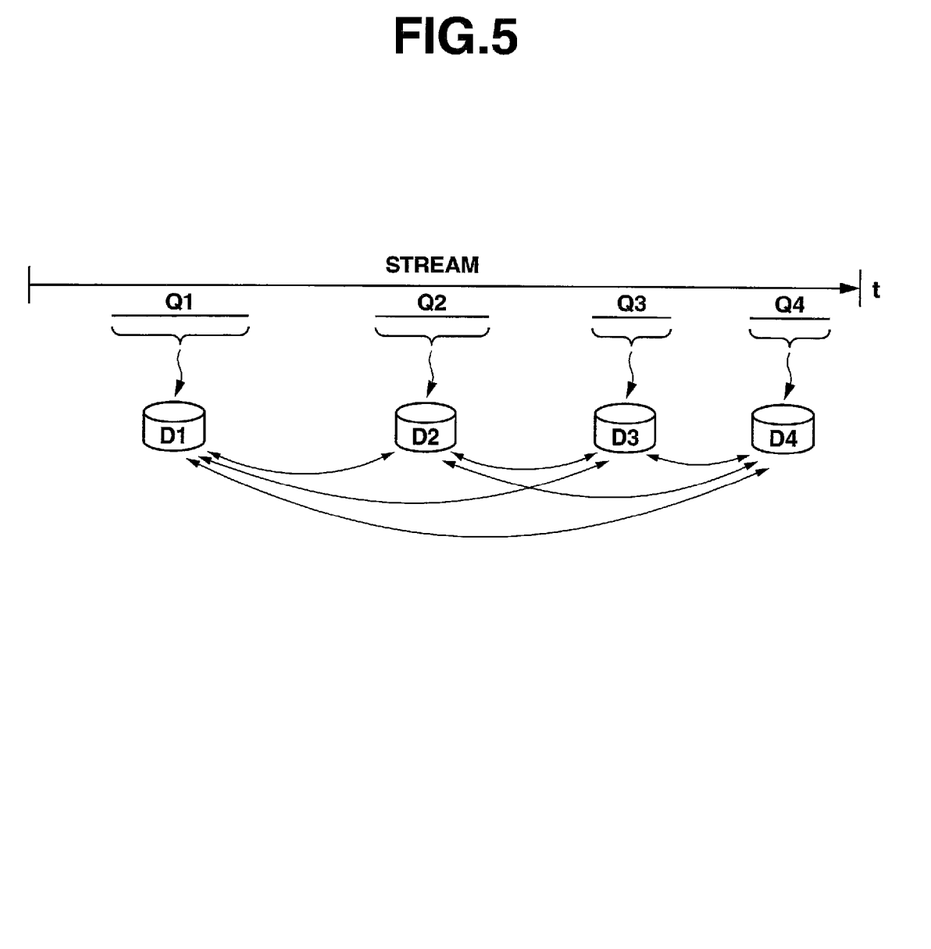
FIG. 5 is a diagram for explaining content of a creation process of a face image dictionary of step S7 and a face similarity calculation process of step S8.

The processes of steps S7 and S8 will be described with reference to FIG. 5. FIG. 5 is a diagram for explaining the content of the creation process of face image dictionary of step S7 and the face similarity calculation process of step S8.

To simplify the description, FIG. 5 shows a case in which the CPU 11 creates four face sequences Q1, Q2, Q3, and Q4 in one stream. In step S7, the CPU 11 creates one face image dictionary for each sequence. Therefore, as shown in FIG. 5, the CPU 11 creates face image dictionaries D1, D2, D3, and D4 for the sequences Q1, Q2, Q3, and Q4, respectively.

In step S8, the CPU 11 calculates the similarities between four created face image dictionaries. In FIG. 5, the CPU 11 calculates the similarities between the face image dictionary D1 and each of the other face image dictionaries D2, D3, and D4, and similarly, calculates the similarities between the face image dictionaries D2, D3, and D4 and each of the other face image dictionaries. Since there are four face sequences in the case of FIG. 5, the CPU 11 performs the similarity calculation six times.

The process returns to FIG. 4, and after step S8, the CPU 11 executes a face clustering process (step S9).

In the face clustering process of step S9, the CPU 11 sets combinations (hereinafter, expressed "combine") among the combinations of all face sequences, in which the similarities calculated and corrected in step S8 are equal to or greater than a predetermined threshold TH, as same persons. In this way, the CPU 11 classifies all sequences into M person categories. Therefore, two face sequences with the similarity equal to or greater than the predetermined threshold TH are combined and classified into a class of a same person. Specifically, in step S9, if the corrected similarity is equal to or greater than the predetermined threshold TH, the CPU 11 determines the pair of the face image dictionaries as face image dictionaries of the same person. If the corrected similarity is smaller than the predetermined threshold TH, the CPU 11 determines the pair of the face image dictionaries as face image dictionaries of different persons. In this way, the CPU 11 clusters the plurality of face image dictionaries. If the processes of steps S1 to S9 are completely ideally executed, the number of actual performers and the number of person categories M match.

Step S9 constitutes a face clustering section configured to compare the plurality of similarities corrected in step S8 and the predetermined threshold TH to cluster the plurality of face image dictionaries Di and Dj.

However, the threshold is usually set high to prevent different persons to be in the same person categories. Therefore, the same persons remain divided into a plurality of person categories, and the number of person categories M tends to be greater than the number of actual performers.

However, an object of face clustering is to reduce the number of person categories M to the correct number of persons without mixing different persons in the same person categories. Therefore, in the video indexing process of the present embodiment, the CPU 11 corrects the face similarities in the calculation process of face similarity to improve the accuracy of face clustering.

(Correction of Similarity)

The correction process of similarity in the calculation of the face similarities in step S8 will be described.

A similarity Sij between two face image dictionaries Di and Dj (i, j: face sequence numbers) is expressed by the following Equation (1).

$$Sij = MSM(Di, Dj) \qquad \text{Equation (1)}$$

MSM (d1, d2) denotes a similarity expressed by a canonical angle of subspaces d1 and d2 and is calculated by the mutual subspace method described in Document 6.

In the face clustering process, the CPU 11 uses Sij as a similarity between two face sequences Qi and Qj and assumes that Qi and Qj are the same person if Sij is greater than a predetermined threshold.

However, there can be faces, in which the similarity with other persons tends to be high, and faces, in which the similarity with other persons tends to be low. Therefore, among the created face image dictionaries, there are dictionaries, in which the similarity with other persons is high on average, and dictionaries, in which the similarity with other persons is low on average. Appropriate setting of the predetermined threshold is usually not easy.

The similarity and clustering will be described here.

Figure 6:
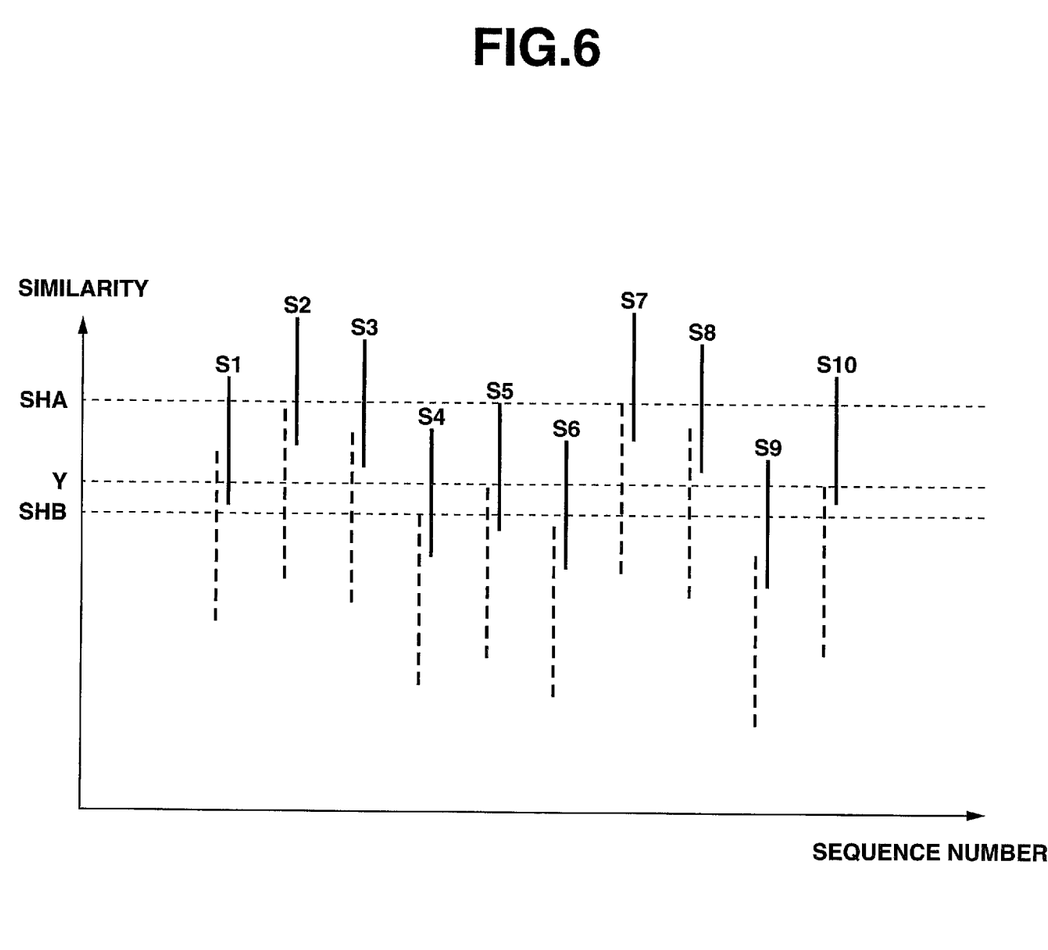
FIG. 6 is a diagram schematically illustrating a similarity distribution when similarities between a plurality of user dictionaries and a plurality of other person dictionaries are calculated.

FIG. 6 is a diagram schematically illustrating a similarity distribution when similarities between a plurality of user dictionaries and a plurality of other person dictionaries are calculated for human face sequences S1 to S10 of ten persons.

In FIG. 6, there are a plurality of user dictionaries and a plurality of other person dictionaries, and not N face sequences in step S8, but a plurality of separately prepared face image subspace dictionaries of the user are illustrated. In FIG. 6, solid lines show distribution widths of similarities between the plurality of face image subspace dictionaries of the user, and broken lines show distribution widths of similarities between each face image space dictionary of the user and the plurality of other person dictionaries. As shown in FIG. 6, there is dispersion of average values of the similarity distributions of the face sequences. Therefore, appropriate setting of the threshold in relation to the similarities for face clustering is not easy.

For example, in the case of FIG. 6, if the threshold of similarity is set to a threshold SHA, the similarities (broken lines) with other persons of the face sequences S1 to S10 do not exceed the threshold SHA. Therefore, the possibility that the other persons are mixed in the same person categories (or user dictionaries) is low. However, all similarities of the user of the face sequences S4, S5, S6, and S9 are smaller than the threshold SHA, and the possibility that the face sequences S4, S5, S6, and S9 are classified into the same person categories (or user dictionaries) is also low.

On the other hand, if the threshold of similarity is lowered to set the threshold to a threshold SHB, the possibility that the similarities with other persons of the face sequences other than the face sequences S4, S6, and S9 exceed the threshold SHB is high enough. Therefore, other persons are mixed in the same person categories (or user dictionaries) in many cases.

To solve the problem, face image dictionaries (hereinafter, "external dictionary") of a plurality of persons, as many persons as possible, are prepared in the present embodiment. The CPU 11 corrects the similarities in Equation (1) based on the plurality of external dictionaries and the pairs of similarities. Each external dictionary also includes a plurality of feature amount data of face images. The CPU 11 calculates the plurality of external dictionaries and the pairs of similarities based on the mutual subspace method.

The face images for the external dictionaries are sample face images, and it is preferable that the face images include faces and the number of faces that cover as many general human faces as possible. This can prevent the dispersion of the average values of the similarity distribution of the face sequences and improve the performance of face clustering.

For example, it is preferable that the plurality of external dictionaries are dictionaries generated from face images of a plurality of persons without bias of at least age and sex. "Without bias in age and sex" means that at least the numbers of persons in age brackets (for examples, 10's and 20's) are substantially the same and the numbers of males and females are also substantially the same. It is more preferable that the plurality of external dictionaries are dictionaries generated from face images of a plurality of persons without bias in race and regionality.

The content of computation of the similarities obtained in step S8 will be described.

A similarity $S'ij$ of the face sequences $Q_i$ and $Q_j$ in the present embodiment are expressed by the following equation.

$$S'ij = Sij \times Y / \alpha(i,j) \quad \text{Equation (2-1)}$$

Sij denotes the similarity obtained by Equation (1), and $\alpha(i,j)$ denotes a coefficient obtained by calculating the following equations based on the similarities between each of the face sequences $Q_i$ and $Q_j$ and K external dictionaries. Y denotes a parameter for determining a center of the similarity distribution as well as expansion and contraction and is assumed to be an average value of the similarities between a multiplicity of face sequences in the present embodiment.

$$Ti = \Sigma k(MSM(Di, Gk))/K \quad \text{Equation (2-2)}$$

$$Tj = \Sigma k(MSM(Dj, Gk))/K \quad \text{Equation (2-3)}$$

$$\alpha(i,j) = SQRT(Ti \times Tj) \quad \text{Equation (2-4)}$$

Di and Dj denote face image dictionaries created from the face sequences $Q_i$ and $Q_j$, respectively, Gk (k=1, 2, ..., K) denotes external dictionaries (subspaces), and SQRT(a) denotes a function for obtaining a square root of a. Ti and Tj denote average values of the similarities of pairs of the face sequences $Q_i$ and $Q_j$ and the external dictionaries, respectively, in other words, average similarities. The external dictionaries are face image dictionaries (subspaces) created by the same method as in steps S5 to S7 based on face images of a plurality of persons (K persons), and K persons do not include the same person.

Figure 7:
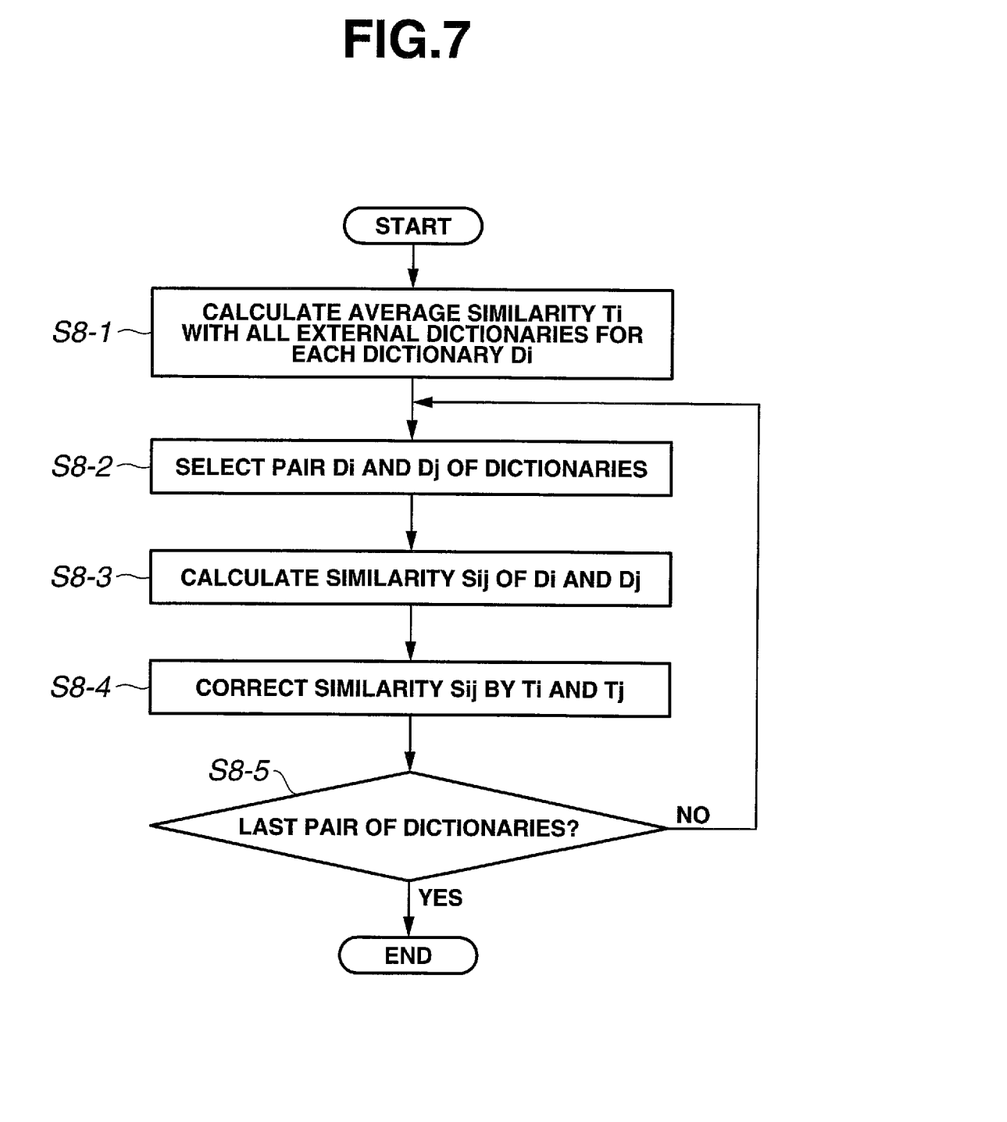
FIG. 7 is a flow chart showing an example of processing content of step S8 of FIG. 4.

A calculation step of the specific correction described above will now be described in detail. FIG. 7 is a flow chart showing an example of the processing content of step S8 of FIG. 4.

The CPU 11 first calculates the similarities with all external dictionaries ODk (k is 1 to K) for each face image dictionary Di and calculates an average similarity Ti with the external dictionaries for each face image dictionary Di based on the obtained K similarities (step S8-1). The average similarity Ti obtained in step S8-1 is a value obtained by the calculation of Equation (2-2).

The CPU 11 then selects a pair Di and Dj of face image dictionaries (step S8-2) and calculates the similarity Sij of the pair Di and Dj (step S8-3). The similarity Sij is a value obtained by the calculation of Equation (1). Steps S8-2 and S8-3 constitute a similarity calculating section configured to calculate the similarity of each pair in the plurality of face image dictionaries Di and Dj. Step S8-1 constitutes a similarity calculating section configured to calculate the similarity of each pair of each of the face image dictionaries Di and Dj and the plurality of external dictionaries.

The CPU 11 then corrects the similarities Sij based on the average similarities Ti and Tj (step S8-4). Specifically, the calculation by Equation (2-1) is performed in step S8-4. Step S8-4 constitutes a similarity correcting section configured to correct the similarity of each pair in the plurality of face image dictionaries Di and Dj by the similarity of each pair of each of the face image dictionaries Di and Dj and the plurality of external dictionaries.

The CPU 11 further determines whether the pair is a pair of the last dictionaries (step S8-5). If the pair is not a pair of the last dictionaries, the process returns to step S8-2. If the pair is a pair of the last dictionaries, the process ends.

Figure 8:
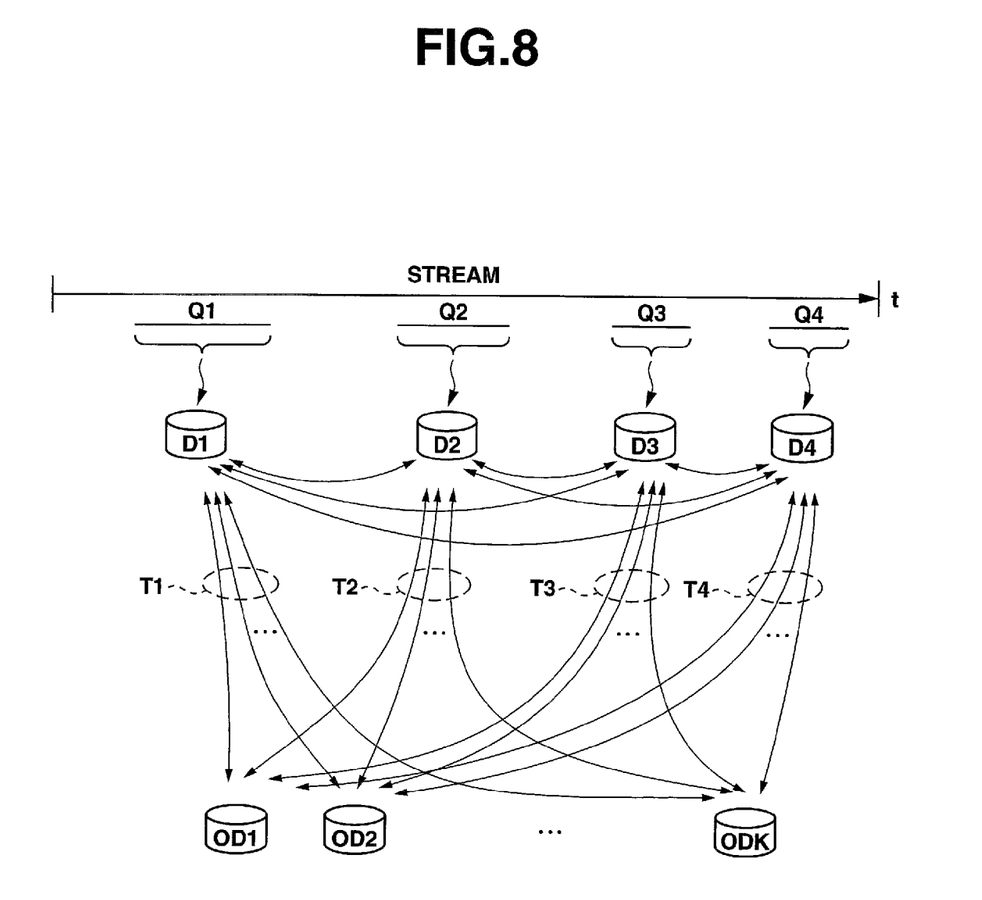
FIG. 8 is a diagram for explaining calculation of an average similarity.

FIG. 8 is a diagram for explaining the calculation of the average similarity. As shown in FIG. 8, if there are four face image dictionaries D1 to D4, the CPU 11 calculates the similarity between the face image dictionary D1 and each of K external dictionaries OD1 to ODK. For the obtained K similarities, the CPU 11 calculates an average similarity T1 with the plurality of (K in this case) external dictionaries in relation to the face image dictionary D1 based on Equation (2-2). Similarly, the CPU 11 calculates and obtains average similarities T2, T3, and T4 for the remaining three face image dictionaries D2, D3, and D4.

Figure 9:
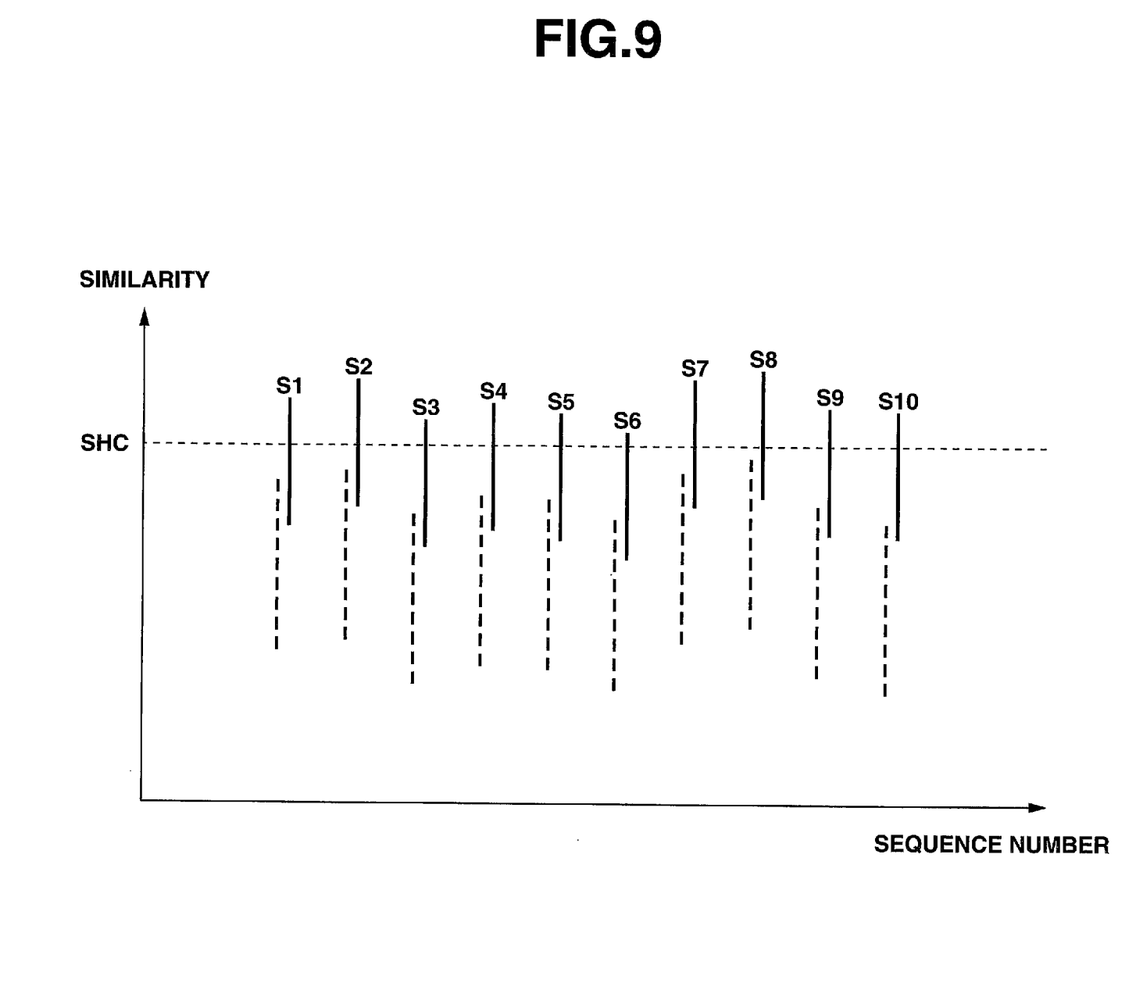
FIG. 9 is a schematic diagram when a face similarity distribution is created when the similarities are corrected by Equation (2-1)

FIG. 9 is a schematic diagram when the similarities are corrected for the human face sequences S1 to S10 of ten persons of FIG. 6 by Equation (2-1) to create a similar face similarity distribution. Compared to FIG. 6 in which the correction is not performed, the dispersion of the average values of the similarity distributions of the face sequences is reduced. This is because in Equation (2-1), the CPU 11 divides the similarity Sij by the coefficient $\alpha(i,j)$ to repress dispersion in the similarity distributions between the face sequences. Specifically, as can be seen from Equation (2-1), the greater the similarity between the face image dictionary and the external dictionary is, the smaller the similarity $S'ij$ is. The smaller the similarity between the face image dictionary and the external dictionary is, the greater the similarity $S'ij$ is. That is, as the average similarities Ti, Tj between the face image dictionaries of the face sequences $Q_i$, $Q_j$ and the external dictionaries are more largely distant from the center Y of the similarity distribution, the similarity $S'ij$ is largely corrected. For example, when the average similarities Ti, Tj between the face sequences $Q_i$, $Q_j$ and the face image dictionaries are quite larger or quite smaller than the center Y of the similarity distribution, the similarity $S'ij$ is largely corrected. On the other hand, when the average similarities Ti, Tj between the face sequences $Q_i$, $Q_j$ and the face image dictionaries are slightly larger or slightly smaller than the center Y of the similarity distribution, the similarity $S'ij$ is slightly corrected.

In other words, in step S8-4, the CPU 11 corrects the similarities to push down the overall similarity distributions of persons, in which the similarities with the user and the other persons tend to be high, and to push up the overall similarity distributions of persons, in which the similarities with the user and the other persons tend to be low. This can attain an advantage that the centers of the similarity distributions of the persons, in which the similarities with the user and the other persons tend to be high and tend to be low, approach a certain value.

In the case of FIG. 6, in which the correction is not performed, if the threshold is set to SHA to prevent the other persons from entering the categories of the same persons, there is almost no possibility that the similarities of the user of the face sequences S4, S5, S6, and S9 exceed the threshold SHA. Therefore, even if there are a plurality of face sequences of the same persons as in the face sequences S4, S5, S6, and S9 in the video, the sequences are not combined as the sequences of the same person. Furthermore, if the threshold is lowered to the threshold SHB, the other persons are mixed in the categories of the same persons in many cases. In other words, if the correction is not performed, the result of face clustering is insufficient no matter how the threshold is set.

On the other hand, in the present embodiment, if the threshold is set to a threshold SHC of FIG. 9, other persons are not put into the categories of the same persons as shown in FIG. 9, and the similarity distributions of the user of all face sequences partially exceeds the threshold. Therefore, more face sequences may be classified into the categories of the same persons than in FIG. 6 in which the correction is not performed.

According to the present embodiment, the similarities are corrected as described above. Therefore, the difficulty in setting the threshold in face clustering is alleviated, and an image processing apparatus with improved face clustering performance can be provided.

Figure 10:
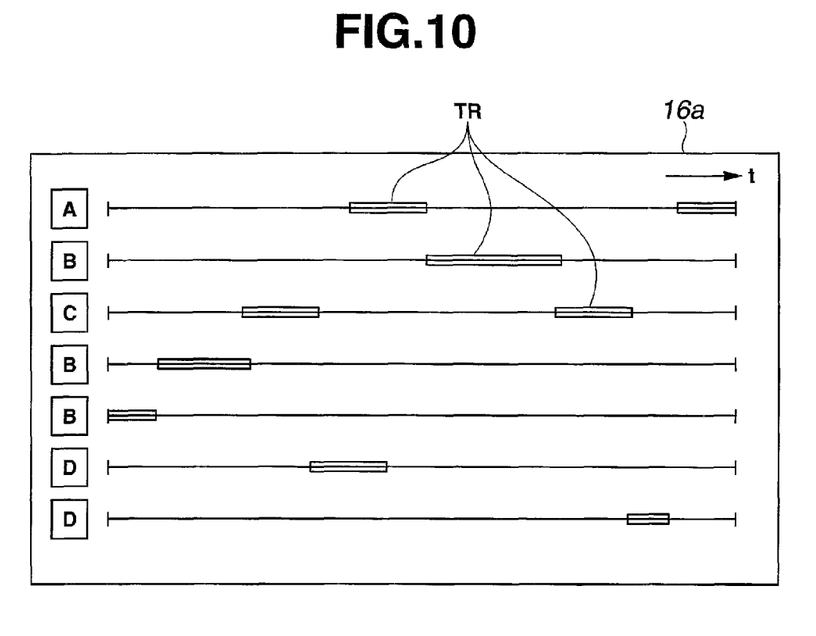
FIG. 10 is a diagram showing an example of a screen displaying a result of the face recognition video indexing process when the similarities are not corrected.
Figure 11:
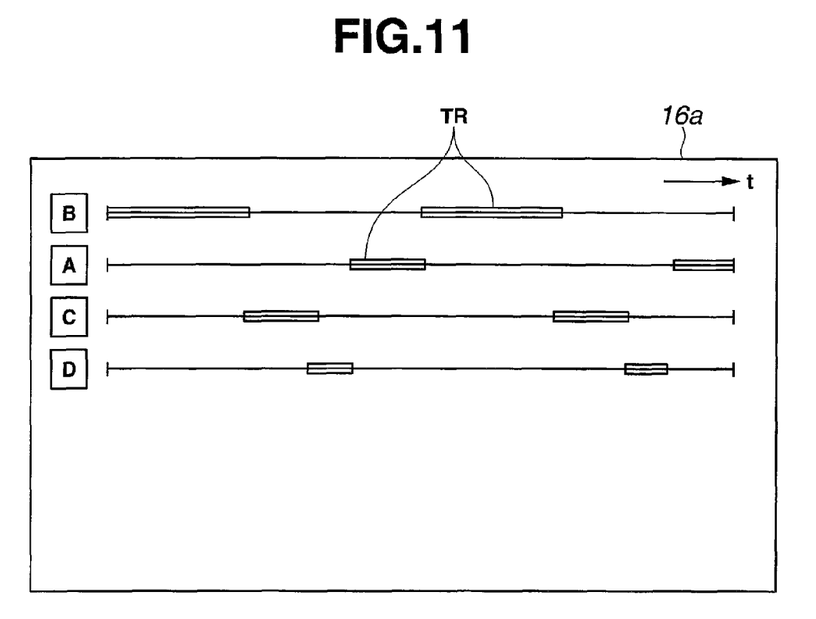
FIG. 11 is a diagram showing an example of a screen displaying a result of the face recognition video indexing process when the similarities are corrected.

FIG. 10 is a diagram showing an example of a screen displaying the result of the face recognition video indexing process when the similarities are not corrected in video images in which four persons A, B, C, and D appear. FIG. 11 is a diagram showing an example of a screen displaying the result of the face recognition video indexing process when the similarities are corrected in the video images in which four persons A, B, C, and D appear. The screens of FIGS. 10 and 11 are displayed on a screen 16a of the monitor 16, and performance time zones of the performers are illustrated by band shapes TR based on the video indexing process. In FIGS. 10 and 11, a horizontal axis denotes time axes, and a vertical axis denotes performers. Each time axis of the horizontal axis is equivalent to one same person category.

In FIG. 10, the face image dictionaries are clustered into categories of seven persons by face image clustering. In FIG. 11, the face image dictionaries are clustered into four categories. In FIGS. 10 and 11, although the alphabets A, B, C, and D aligned in the vertical axis on the left end of the time axis illustrate correct person labels for explanation, thumbnails of the face images of the persons are displayed at the parts of the alphabets.

In the video indexing process, the face recognition technique is used to provide an index to each recognized face in the video to efficiently watch the video content, such as to watch only the scenes of a specific performer in video image data such as a TV program. As a result, for example, as shown in FIG. 10 or 11, the processing result of video indexing can be illustrated, in which the thick lines on the time axis show to which time zones in the video images the face sequences included in the same categories belong.

The viewer can see the screen 16a to select and watch only the scenes of the performer that the viewer wants to see. However, if the correction of similarity is not used, the person B remains being divided into three, and the person D remains being divided into two as shown for example in FIG. 10. Therefore, it is difficult for the viewer to correctly figure out the number of characters and where the performers are performing at a glance. On the other hand, in the case of FIG. 11, each of all persons is classified into one category. Therefore, the viewer can accurately figure out information related to the characters at a glance.

As a result of the correction of similarity in the present embodiment, the number of performers becomes equal to or close to the number of actual persons. Therefore, the accuracy of face clustering improves, and the efficiency of watching the video content improves.

Thus, according to the image processing apparatus configured to correct the similarities according to the present embodiment, executing the similarity correction process and appropriate threshold setting can improve the performance of face recognition video indexing and enhance the convenience of the viewer.

Although Equation (2-1) is used for the correction process of similarity in the present embodiment, in addition to the following Equation (3-1), various calculation equations or calculation methods may be used.

$$S'ij = Sij \times Y/\beta(i,j) \qquad \text{Equation (3-1)}$$

$$Ti = \Sigma k(MSM(Di, Gk))/K \qquad \text{Equation (3-2)}$$

$$Tj = \Sigma k(MSM(Dj, Gk))/K \qquad \text{Equation (3-3)}$$

$$\beta(i,j) = (Ti + Tj)/2 \qquad \text{Equation (3-4)}$$

As described, in the image processing process of the present embodiment, "tendency to look like other person" of two faces is calculated to calculate the similarity between the two faces, and the similarity between the two faces is corrected by the tendency to look like other persons.

Therefore, according to the image processing apparatus of the present embodiment, the difficulty in setting the threshold in face clustering is alleviated, and the face clustering performance improves.

The order of execution of steps of the procedures in the present embodiment may be changed without departing from the nature of steps. A plurality of steps may be simultaneously executed, or steps may be executed in a different order in each execution.

All or part of program codes of a program for executing the operation described above are recorded or stored in a portable medium, such as a flexible disk and a CD-ROM, or in a storage medium, such as a hard disk, as a computer program product. A computer reads out the program to execute all or part of the operations. Alternatively, all or part of the codes of the program can be distributed or provided through a communication network. The user can download the program through the communication network to install the program on the computer or install the program on the computer from the recording medium to easily realize the image processing apparatus of the present invention.

The present invention is not limited to the embodiment, and various changes, modification, etc., can be made without changing the scope of the present invention.

What is claimed is:

1. An image processing apparatus comprising:
    a sequence creating section configured to create a plurality of sequences in such a manner that one sequence includes consecutive face images of a same person in video image data;
    a similarity calculating section configured to calculate a first similarity between each pair in a plurality of face image dictionaries created for each sequence and a second similarity between each pair of each face image dictionary and a predetermined plurality of dictionaries;

a similarity correcting section configured to correct the calculated and obtained plurality of first similarities using the second similarities; and a face clustering section configured to compare the plurality of first similarities corrected by the similarity correcting section with a predetermined threshold to cluster the plurality of face image dictionaries.

2. The image processing apparatus according to claim 1, wherein, when the second similarities are distant from a predetermined value, the similarity correcting section corrects the first similarities so as to make the first similarities approach the predetermined value.

3. The image processing apparatus according to claim 1, wherein the similarity correcting section uses an average value of the second similarities between each of the face image dictionaries and the predetermined plurality of dictionaries to correct the first similarities using the second similarities.

4. The image processing apparatus according to claim 1, wherein the similarity calculating section calculates the first similarity of the each pair and the second similarity of the each pair by a mutual subspace method.

5. The image processing apparatus according to claim 1, wherein the face clustering section clusters the plurality of face image dictionaries by determining that a pair of face image dictionaries is face image dictionaries of a same person if the corrected plurality of first similarities are equal to or greater than the predetermined threshold and determining that a pair of face image dictionaries is face image dictionaries of another person if the corrected plurality of first similarities are smaller than the predetermined threshold.

6. The image processing apparatus according to claim 1, further comprising:

a face image detecting section configured to detect the face images in each frame included in the video image data;

an inter-frame similarity calculating section configured to calculate inter-frame similarities of two consecutive frames in the video image data; and a sequence creating section configured to create the plurality of sequences based on the plurality of face images detected by the face image detecting section and the inter-frame similarities calculated and obtained by the inter-frame similarity calculating section.

7. An image processing method comprising:

calculating a first similarity between each pair in a plurality of face image dictionaries corresponding to a plurality of sequences created in such a manner that one sequence includes a plurality of frames with a plurality of consecutive face images included in video image data, and a second similarity between each pair of each face image dictionary and a predetermined plurality of dictionaries;

correcting the calculated and obtained plurality of first similarities using the second similarities; and comparing the corrected plurality of first similarities with a predetermined threshold to cluster the plurality of face image dictionaries.

8. The image processing method according to claim 7, wherein when the second similarities are distant from a predetermined value, the first similarities are corrected so as to approach the predetermined value.

9. The image processing method according to claim 8, wherein the plurality of face image dictionaries are clustered by determining that a pair of face image dictionaries is face image dictionaries of a same person if the corrected plurality of first similarities are equal to or greater than the predetermined threshold and determining that a pair of face image dictionaries is face image dictionaries of another person if the corrected plurality of first similarities are smaller than the predetermined threshold.

10. The image processing method according to claim 7, wherein an average value of the second similarities between each of the face image dictionaries and the predetermined plurality of dictionaries is used to correct the first similarities using the second similarities.

11. The image processing method according to claim 10, further comprising:

detecting the face images in each frame included in the video image data;

calculating inter-frame similarities of two consecutive frames in the video image data; and creating the plurality of sequences based on the plurality of detected face images and the calculated and obtained inter-frame similarities.

12. The image processing method according to claim 7, wherein the first similarity of the each pair and the second similarity of the each pair are calculated by a mutual subspace method.

13. An image processing apparatus comprising:

a face image detecting section configured to detect face images in each frame included in video image data;

an inter-frame similarity calculating section configured to calculate inter-frame similarities of two consecutive frames in the video image data;

a sequence creating section configured to create a plurality of sequences in such a manner that one sequence includes consecutive face images of a same person in the video image data, based on the plurality of face images detected by the face image detecting section and the inter-frame similarities calculated and obtained by the inter-frame similarity calculating section;

a similarity calculating section configured to calculate a first similarity between each pair in a plurality of face image dictionaries created for each sequence and a second similarity between each pair of each face image dictionary and a predetermined plurality of dictionaries;

a similarity correcting section configured to correct the calculated and obtained plurality of first similarities using the second similarities; and a face clustering section configured to compare the plurality of first similarities corrected by the similarity correcting section with a predetermined threshold to cluster the plurality of face image dictionaries.

14. The image processing apparatus according to claim 13, wherein the similarity calculating section calculates the first similarity of the each pair and the second similarity of the each pair by a mutual subspace method.

15. The image processing apparatus according to claim 13, wherein, when the second similarities are distant from a predetermined value, the similarity correcting section corrects the first similarities so as to make the first similarities approach the predetermined value.

16. The image processing apparatus according to claim 13, wherein
the similarity correcting section uses an average value of the second similarities between each of the face image dictionaries and the predetermined plurality of dictionaries to correct the first similarities using the second similarities.

\* \* \* \* \*